United States Patent
Novik et al.

(10) Patent No.: US 11,630,893 B2
(45) Date of Patent: *Apr. 18, 2023

(54) SYSTEM AND METHOD FOR MONITORING TOUCH-SCREEN GESTURES OF USERS AND FOR USER AUTHENTICATION

(71) Applicant: BIOCATCH LTD., Tel Aviv (IL)

(72) Inventors: Alesis Novik, London (GB); Andrius Sutas, London (GB)

(73) Assignee: BIOCATCH LTD., Tel Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 17/574,595

(22) Filed: Jan. 13, 2022

(65) Prior Publication Data

US 2022/0138588 A1    May 5, 2022

Related U.S. Application Data

(63) Continuation of application No. 16/902,289, filed on Jun. 16, 2020, now Pat. No. 11,238,349, which is a (Continued)

(30) Foreign Application Priority Data

Jun. 25, 2015  (GB) .................................... 1511230

(51) Int. Cl.
*G06F 21/00* (2013.01)
*G06F 21/32* (2013.01)
(Continued)

(52) U.S. Cl.
CPC .............. *G06F 21/32* (2013.01); *G06F 18/23* (2023.01); *G06F 18/24323* (2023.01);
(Continued)

(58) Field of Classification Search
CPC ... G06F 21/316; G06F 21/32; G06K 9/00892; G06K 9/6218; G06K 9/6282; G06K 9/6293
See application file for complete search history.

(56) References Cited

U.S. PATENT DOCUMENTS

2008/0091453 A1* 4/2008 Meehan ................ G07F 19/207
                                                            705/317
2016/0300049 A1* 10/2016 Gu ........................ G06V 10/424

* cited by examiner

*Primary Examiner* — Jeffrey C Pwu
*Assistant Examiner* — Thong P Truong
(74) *Attorney, Agent, or Firm* — AlphaPatent Associates Ltd.; Daniel J. Swirsky

(57) ABSTRACT

The present invention relates to an improved method of providing identification of a user or authentication of a user's identity. More particularly, the present invention relates to an improved method of providing identification of a user or authentication of a user's identity using conditional behavioural biometrics.

The present invention seeks to provide an enhanced method of authenticating and/or identifying a user identity using conditional behavioural biometrics.

According to a first aspect of the present invention, there is provided a method of generating a user profile for use in identifying and/or authenticating a user on a device, the device equipped with one or more sensors, the method comprising: generating a set of data points from sensory data collected by the one or more sensors; clustering the set of data points to produce a set of data clusters; developing a first classifier for the data clusters, the first classifier being operable to assign a further data point derived from a further user interaction with the computing device to one of the data clusters; and developing one or more further classifiers for at least one of the data clusters, the further classifier operable to identify and/or authenticate a user identity based on the further data point.

19 Claims, 2 Drawing Sheets

Related U.S. Application Data continuation of application No. 15/192,845, filed on Jun. 24, 2016, now Pat. No. 10,719,765.

(51) Int. Cl.
*G06F 21/31* (2013.01)
*G06V 40/70* (2022.01)
*G06F 18/23* (2023.01)
*G06F 18/25* (2023.01)
*G06F 18/243* (2023.01)
*G06N 3/126* (2023.01)

(52) U.S. Cl.
CPC .......... *G06F 18/256* (2023.01); *G06F 21/316* (2013.01); *G06N 3/126* (2013.01); *G06V 40/70* (2022.01)

SYSTEM AND METHOD FOR MONITORING TOUCH-SCREEN GESTURES OF USERS AND FOR USER AUTHENTICATION

CROSS-REFERENCE TO RELATED APPLICATIONS

This patent application is a Continuation of U.S. Ser. No. 16/902,289, filed on Jun. 16, 2020, which is hereby incorporated by reference in its entirety; which is a Continuation of U.S. Ser. No. 15/192,845, filed on Jun. 24, 2016, now U.S. Pat. No. 10,719,765 (issued on Jul. 21, 2020), which is hereby incorporated by reference in its entirety; which claims priority from Great Britain Patent Application GB 1511230.3, filed on Jun. 25, 2015, which is hereby incorporated by reference in its entirety.

FIELD OF THE INVENTION

The present invention relates to an improved method of providing identification of a user or authentication of a user's identity. More particularly, the present invention relates to an improved method of providing identification of a user or authentication of a user's identity using conditional behavioural biometrics.

BACKGROUND

For the purposes of this specification, identification typically involves the collection of data and a determination of who a user is from a database of users while authentication typically involves the use of data to confirm a user is who they present themselves to be (i.e. to verify a user's identity).

Identification and/or authentication of a user identity is an essential step in accessing many secure services or devices, such as banking, stored personal details or other restricted data. This identification and/or authentication is usually achieved by the use of passwords or personal identification numbers (PINs), which are usually assumed to be known only by the authorised user or users of a service or device.

However, knowledge of a user's password or PIN is enough for an unauthorised third party to gain access to the service or device. Additional layers of security or improved security are therefore required to reduce the risk of passwords and PINs from being used by unauthorised third parties.

Adding further security measures to the authentication process usually requires a trade-off between the increased level of security and the degradation of the user experience.

SUMMARY OF THE INVENTION

The present invention seeks to provide an enhanced method of authenticating and/or identifying a user identity using conditional behavioural biometrics.

According to a first aspect of the present invention, there is provided a method of generating a user profile for use in identifying and/or authenticating a user on a device, the device equipped with one or more sensors, the method comprising: generating a set of data points from sensory data collected by the one or more sensors; clustering the set of data points to produce a set of data clusters; developing a first classifier for the data clusters, the first classifier being operable to assign a further data point derived from a further user interaction with the computing device to one of the data clusters; and developing one or more further classifiers for at least one of the data clusters, the further classifier operable to identify and/or authenticate a user identity based on the further data point.

According to a second aspect of the invention, there is provided a method of identifying and/or authenticating a user on a device, the device equipped with one or more sensors, the method comprising: generating a data point from sensory data derived from a user interaction with the device; assigning the data point to a cluster of data points using a first classifier, the first classifier developed from a plurality of previous user interactions with the device; and applying a second classifier to the data point, the second classifier being chosen based on the assigned data cluster, and operable to identify and/or authenticate a user identity based on the further data point.

By classifying sensory data based on previous user interactions with a computing device, an additional layer of security can be provided over solely using a password or PIN input for security as a device can identify and/or authenticate a user separately to the user providing credentials to identify or authenticate themselves (or identify then authenticate themselves). The classifier is developed from a plurality of previous user interactions with the computing device. Using conditional behavioural biometrics can remove the trade-off between security versus any degradation of the user experience necessary when using PINs or passwords to authenticate a user. Optionally, the classifier can be based on biometric and/or behavioural data collected, further optionally where the classifier can be based on biometric and/or behavioural data collected during a user interaction with the device. By clustering user data while generating a user profile, different user contexts can be identified and a separate identification and/or authentication classifier can be trained for each one. Having context specific classifiers for identification and/or authentication can allow for a higher accuracy of identification and/or authentication in comparison with using a single classifier for every situation, since a user will in general interact with a computing device differently depending on the context. Herein, sensory data is used to connote data from or derived from the sensors—i.e. sensor data. A classifier is taken to connote any algorithm for statistical classification of a data set.

Optionally, the sensory data is collected during a plurality of user interactions with the device.

By using the data collected during multiple user interactions with the device to develop the user profile a more accurate set of classifiers may be obtained.

Optionally, an algorithm is used to perform the clustering of the data points derived from the sensory data.

Optionally, the algorithm is one or more clustering algorithms based on one of a K-means algorithm or a Gaussian Mixture Model using an Expectation-Maximisation algorithm.

K-means algorithms and Gaussian Mixture Models can be used to efficiently cluster the user data during the generation of a user profile.

Optionally, the identification and/or authentication of the user further comprises the step of identifying and/or authenticating the user identity using the further classifiers.

Using the classifiers to identify and/or authenticate the user identity can remove the need for the user to manually enter identification and/or authentication data, enhancing the user experience.

Optionally, the output of the second classifier is a confidence score in the user identity and/or authentication.

Optionally, if the confidence score is below a pre-defined threshold, further identification and/or authentication steps are carried out or the user is not identified and/or authenticated.

By providing a confidence score and using it to determine if further identification and/or authentication steps are required, the error rate associated with false negatives can be reduced.

Optionally, the computing device comprises at least one of: a mobile device; a local server; a cloud or network based server; and a desktop computer.

The profile generation and identification/authentication methods can be performed locally on the user device, remotely on a server or on a combination of the two. This allows for greater flexibility in the implementation of the method.

BRIEF DESCRIPTION OF THE DRAWINGS

Embodiments of the present invention will now be described, by way of example only and with reference to the accompanying drawings having like-reference numerals, in which.

SPECIFIC DESCRIPTION

Figure 1:
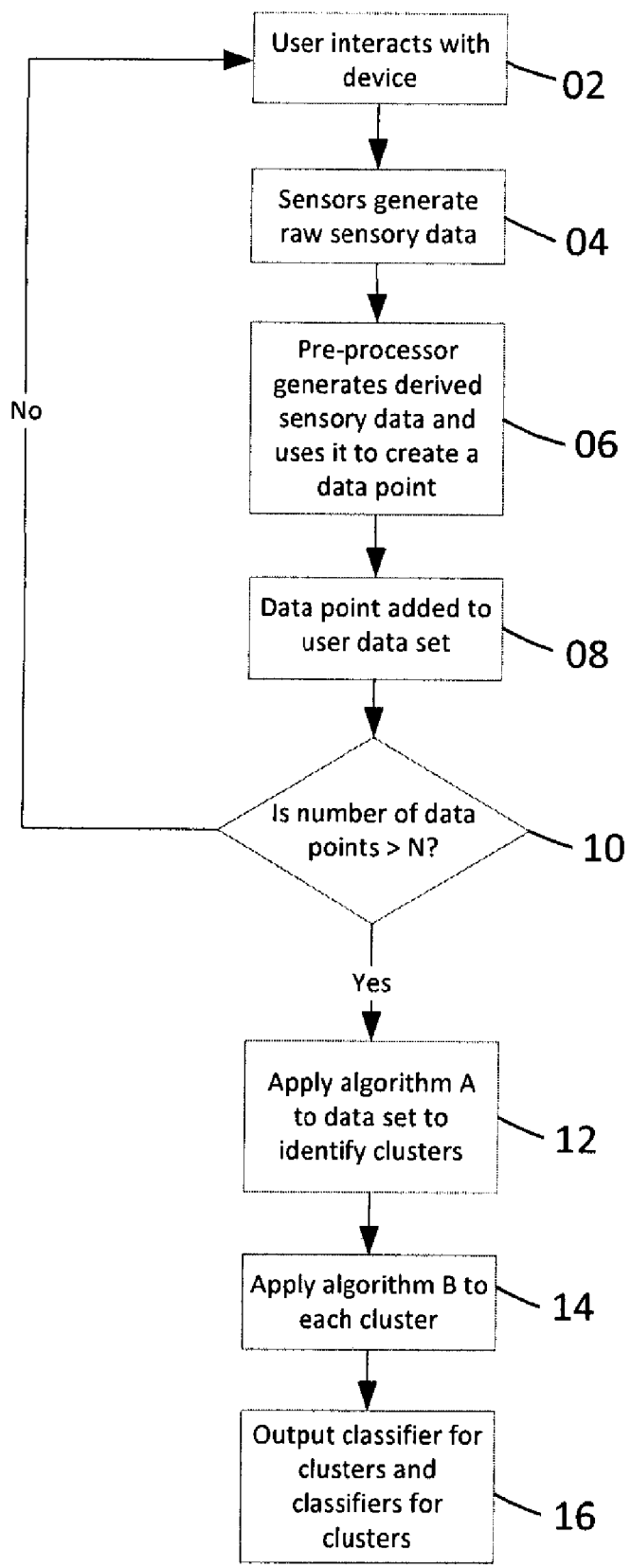
FIG. 1 is a flow chart illustrating the enrolment stage of the method according to an embodiment.
Figure 2:
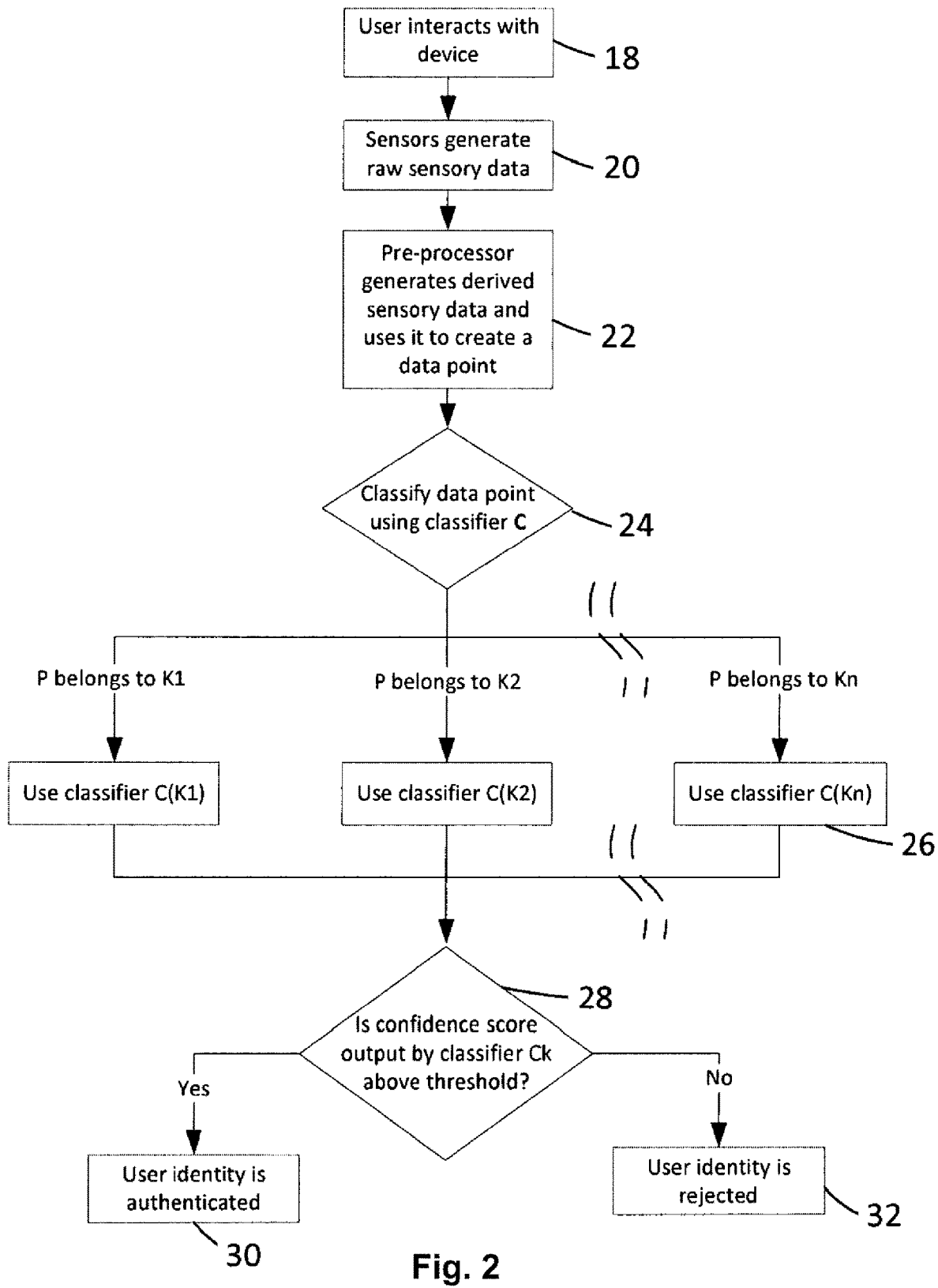
FIG. 2 is a flow chart illustrating the authentication stage of the method according to an embodiment.

Referring to FIGS. 1 and 2, an exemplary embodiment of the method will now be described.

The method relates to providing enhanced identification and/or authentication of the identity of a user on a computing device, by using the user's behaviour while interacting with the device. The method is principally divided into two steps: (a) generating a user profile (herein referred to as the "enrolment stage") based on data collected by the device, optionally only while a user is interacting with the device and further optionally when the user is inputting passwords, PINs or any identity of security data; and (b) the authentication stage, wherein the user profile generated in the enrolment stage is used to authenticate a user identity based on behavioural data collected while inputting a password, PIN or any identity or security data.

Referring to FIG. 1, the enrolment stage of the method will now be described according to an embodiment of the method.

The object of the enrolment stage of the method is to generate a user profile from data generated during a user's interactions with a computing device. The user profile comprises a set of K data clusters corresponding to different contexts to the user activity, a classifier C for assigning new data points to clusters, and a further classifier Ck associated with each cluster for determining whether a user is authentic or not from sensory data collected while the user is entering their details.

The user activity contexts include, but are not limited to, the user location, the user activity (for example the user's movement speed or whether the user is listening to music), the computing device's connections or the device orientation (for example, if the computing device is a mobile device, whether it is the portrait or landscape orientation).

The use of different classifiers for authenticating the user, taking into account the context, allows for a higher degree of accuracy in authenticating the user identity than the use of a single classifier for all situations. For example, a user interacting with a device held in their hand while walking will interact with the device differently to a device on a table in front of them while sitting. The orientation of the device (i.e. whether it is in portrait or landscape modes) may also affect how the user interacts with the device.

During use, a user can interact with a computing device to input, for example, a password or PIN for accessing a secure service or the device. The computing device may be, for example, a personal computer (such as a desktop or laptop computer), mobile computing device (such as a mobile telephone or tablet) or a fixed terminal (such as an ATM or touchscreen kiosk). The computing device is equipped with one or more sensors for measuring certain properties of the user's interaction with the device, and/or environmental properties during the interaction and/or in the background during normal use of the device. The data derived directly from the device sensors will herein be referred to as raw sensory data.

For example, if interacting with a touchscreen device, the touch time, touch timing, touch pressure, touch area and touch location coordinates can be detected and recorded. Other non-limiting examples of raw sensory data include accelerometer data, gyroscopic data, GPS co-ordinates and hover co-ordinates.

Raw sensory data need not only be collected when the user is consciously interacting with the device. For example, if the device is a mobile device, then raw sensory data may be collected while the device is in the user's pocket to provide information about, for example, the user's walking style or how they sit or stand. As raw sensory data can be collected continuously by the device (whether during operation by the user or not), the monitoring of the user's sensory data is continuous and invisible to user, thus the verification of the identity of the user can similarly be continuous and invisible to the user. In contrast, the use of a PIN or fingerprints can only verify identity at a point in time.

The raw sensory data associated with the user's interaction with the device is then passed to a pre-processor (or processor), where it is converted into derived sensory data. Derived sensory data comprises a set of features that can be calculated or derived from the raw sensory data, but which features may not be determined directly by the device's sensors. Non-sensory data derived from other sources (such as the internet) may also be combined with the raw sensory data to generate derived sensory data or used as raw sensory data, depending on the implementation details of the method.

Features derived from raw sensory data can include: a duration of touchscreen interaction; a physical touchscreen interaction distance; a time between touchscreen interactions; maximum, minimum and/or average deviation from a straight line during a touchscreen interaction; acceleration and/or deceleration of a touchscreen interaction; curvature of a touchscreen interaction; length of a touchscreen interaction (all derived from touchscreen associated data); background tremor while using the device; tremor during the interaction with the device (both derived from accelerometer and gyroscope data); device (and therefore user) movement speed (derived from device GPS coordinates and/or other device location service or services); and the orientation of the computing device (derived from magnetometer data). Many other example features are possible to derive from the raw sensory data.

This derived sensory data, along with any usable raw sensory data, is used to generate a data point associated with that particular user interaction. The data point is then added to a user data set, comprising all the data points associated with a given user. If the total number of data points in the set after the new point has been added is fewer than a predetermined number, N, then the process is repeated for further user interactions until the predetermined number of data points has been reached. This data set will form a training set of data for training classifiers for use in authenticating the user identity. It can be stored locally on the user's device and/or in a back end server associated with the provider of the secure service.

The data point comprises a subset of all the raw and derived sensory data. For example, it may include x and y touch coordinates, pressure, typing speed, touch durations and geolocation. Many other examples are possible.

Once the size of the data set has reached a predefined number of data points, a clustering or classification algorithm (herein referred to as algorithm A) is applied to the user data set. The predefined number of data points can be predetermined to be statistically significant or sufficient to allow the classification algorithm to be able to substantially reliably identify the user, or can be chosen adaptively using machine learning techniques. Algorithm A takes the user data set as an input and produces a model of a set of K clusters or classes corresponding to different user behaviours based on a subset of the user data. The subset of data used is predetermined, but alternatively may again be chosen adaptively using machine learning techniques. The optimal number of classes can be chosen using cross validation.

An example of the type of algorithm used as Algorithm A is a K-means clustering algorithm. In this example, initially a set of K random "mean" points is generated. Each of the data points in the data set are assigned to the nearest one of these mean points, based on a metric (for example the Euclidean distance), to form a set of K clusters. A new mean point for each of these clusters is then calculated. The points in the data set are then reassigned to the nearest of these new means to form K new clusters. These two steps are repeated until convergence (in the sense that the clusters no longer change or substantially change between iterations) is achieved. Many other examples are possible, such as Gaussian Mixture Models using an Expectation-Maximisation algorithm.

The clusters identified in this way should correspond to different user activity contexts.

Algorithm A also uses the user data set to develop a classifier C, which can be used to identify further data points as associated with one of the K clusters. This classifier may, for example, be based on a K-nearest neighbour classification, details of which will be outlined below.

Once the data clusters corresponding to different user environments or behaviours have been determined by algorithm A, a second classification algorithm (herein referred to as algorithm B) is applied to the data points within each cluster Ki. Algorithm B trains a separate classifier Ci for each of the K clusters, which distinguishes between a legitimate user and an illegitimate one (an "attacker"). Algorithm B is based on a Random Forest decision-learning tree, but other examples are possible.

It should be noted that algorithm B could be a set of algorithms, for each of the different K clusters.

The output of the enrolment stage is therefore multiple classifiers, or a classifier and a classifier set: a first classifier C for assigning new data points to one of the K clusters identified by algorithm A; and a set of further classifiers {Ci}, each of which is associated with one of the data clusters and is operable to provide authentication of a new data point.

The first classifier and the second classifier set, along with the derived sensory data used to train them, may be stored on the user's computing device, or alternatively on a remote server or group of servers (e.g. a cloud service or cloud) that could, for example, be under the control of the secure service provider. Likewise, the identification of the K clusters and the training of the classifiers can take place either on the user's computing device, or remotely (e.g. within the cloud).

Referring now to FIG. 2, the authentication stage of the method will now be described according to an embodiment of the method.

In the authentication stage of the method, a user interacts with the computing device, generating a data point from sensory data, which is used to authenticate the user's identity.

The authentication stage begins with the user interacting with the computing device while entering authentication data, such as a password or PIN. As the authentication data is entered, raw sensory data, as described above, is generated by sensors associated with the computing device. A preprocessor (or processor) then converts this raw sensory data to derived sensory data, as described above, and generates a data point from it. In this regard, the first steps of the authentication stage are substantially identical to those of the enrolment stage.

Upon generation of the data point, the classifier C (generated by algorithm A in the enrolment stage) is applied to it. This determines which of the K clusters, identified by algorithm A, the data point should be associated with, i.e. which user situation and/or behaviour is the most appropriate to use given the sensory inputs. This can be, for example, achieved by the use of a K-nearest neighbour algorithm, which works by determining the class of the K (not to be confused with the number of clusters) nearest points in the dataset, based on a distance metric (for example the Euclidean distance), and assigning the data point to a cluster based on which cluster contains the largest number of nearest points. It will be appreciated that alternatives to a K-nearest neighbour approach may be used.

Once the first classifier has identified the appropriate cluster, Ki, the corresponding second classifier, Ci, developed by algorithm B in the enrolment stage and associated with the identified cluster, is applied to the data point. This second stage classifier is based on a random forest algorithm, in which the data point is passed through the ensemble of decision trees trained during the enrolment stage. The output of each of these trees is either a pass or a fail. The ratio of the number of passes to the number of fails is used to determine a confidence score that the user identity is correct. The classifier may alternatively be based on a number of other algorithms, including, but not limited to: neural networks; k-nearest neighbours; and naïve Bayes.

The output of the second classifier is a confidence score for the user being an approved user. If this score is above a pre-determined threshold, the user is authenticated as a legitimate, authorised user. The threshold is variable depending on the requirements of the service being accessed by the user, and can be set to prioritise minimising false-positives or false negatives. It adjusts automatically based on the data used to train the classifiers in order to achieve the desired error rates.

The confidence score is output along with the pass/fail authentication result.

If the confidence score does exceed the required threshold, the user may be asked to input more security or authentication data—for example, answering security questions or inputting passwords or PINs.

In an alternative embodiment, the user's interaction with the device is used as described above to authenticate the user identity, without the user being required to input any security data. The user sensory data is collected and monitored in the background on the device and, when a user would normally be required to login to a service to perform authentication, as long as the behavioural biometrics continues to classify the user as the authorised user the user will not be required to provide any password, PIN or fingerprint (for example during an online check out process when purchasing goods or services over the Internet) as any authentication is performed in the background. Should the behavioural biometrics fail to continue to classify the user as the authorised user, the user will be asked to enter further security information.

A user may interact with a secure service through multiple different devices or types of device. When this is the case, the total user data sets associated with the user will be partitioned into subsets based on the device identity before algorithm A is applied. Enrolment is essentially performed for each device type individually.

The computations associated with the enrolment and authentication stages (i.e. the application of algorithms A and B in enrolment and of the classifiers in authentication) can be performed either on the user computing device itself, or on a server or servers associated with the provider of the secure service, or in combination between the device and server or servers.

There are four examples presented here:

In the first example, all computation is performed on the server. The raw and/or derived sensory data derived from the computing device's sensors is transmitted to the server across a network, where the algorithms or classifiers are applied to it. The classifiers trained in the enrolment stage are stored on the server.

In the second example, all the computations are performed on the user device. The classifiers are stored locally on the user computing device. An authentication message is sent to the server upon the computing device authenticating the user identity, allowing the user access to the secure service.

The third example splits the computation between the server and the computer. The enrolment stage computations are performed on the server to train the classifiers. These are then transmitted to the user computing device and stored locally. The user computing device applies the classifiers to the user data point being used for authentication and transmits a message to the server indicating success or failure. This combination is advantageous in the cases when the user computing device has limited processing power, or when the data set is very large.

The fourth example performs the enrolment stage calculations on the user computing device and then transmits the trained classifiers to the server. The authentication stage calculations are then performed by the server when it receives sensory data (or a data point) transmitted to it across a network by the computing device.

If the user is authenticated then the newly authenticated data point can be added to the set data points for use in a future enrolment stage update. Every time a pre-defined number of new data points, M, are added to the data set the model generated by the enrolment stage is updated. This can be done continuously by using the current models as a starting point, or the models can be regenerated completely.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention claimed is:

1. A method comprising:
   (a) monitoring touch-screen gestures of a user, that interacts with an online service via a touch-screen of a computing device;
   (b) generating a user-specific profile that is based at least on:
      (b1) device acceleration during touch-screen gestures of the user, and also
      (b2) device tilt during touch-screen gestures of the user, and also
      (b3) device tremor during touch-screen gestures of the user;
   (c) subsequently, monitoring additional touch-screen gestures, and checking whether the additional touch-screen gestures exhibit device acceleration and device tilt and device tremor that match the user-specific profile generated in step (b);
   (d) if the additional touch-screen gestures do not exhibit device acceleration and device tilt and device tremor that match the user-specific profile generated in step (b), then: generating a notification that a user that interacted in step (c) to access said online service, is different from the user that interacted in step (a) to access said online service.

2. The method of claim 1,
wherein the computing device is a device selected from the group consisting of:
a laptop computer, a personal computer, a desktop computer, a mobile computing device, a mobile telephone, a tablet.

3. The method of claim 1, comprising:
utilizing user interactions with the computing device to authenticate the user identity without requiring the user to input any security data, by collecting and monitoring sensory data in the background on the computing device.

4. The method of claim 1,
wherein the user-specific profile further reflects one or more user-specific features that are selected from the group consisting of: duration of touch-screen interaction, physical distance of touch-screen interaction, time between touch-screen interactions, deviation from a straight line during touch-screen interaction, acceleration of touch-screen interaction, deceleration of touch-screen interaction, curvature of touch-screen interaction, length of touch-screen interaction.

5. The method of claim 1,
wherein the user-specific profile is generated by extracting data-points from user interactions until said data-points reach a number of data-points that is chosen adaptively by a machine learning technique.

6. The method of claim 1,
wherein monitoring touch-screen gestures of the user is performed while the user is entering user-authentication data which includes at least one of: a password, a Personal Identification Number (PIN).

7. The method of claim 1,
wherein monitoring touch-screen gestures of the user is performed during an online check-out process of purchasing goods or services over the Internet.

8. The method of claim 1,
wherein generating the user-specific profile is performed locally by a processor of said computing device.

9. The method of claim 1,
wherein generating the user-specific profile is performed on a remote server which receives from the computing device at least one of: raw sensory data, derived sensory data.

10. A method comprising:
(a) monitoring touch-screen gestures of a user, that interacts with an online service via a touch-screen of a computing device;
(b) generating a user-specific profile that is based at least on:
  (b1) a user-specific characteristic of background tremor of the computing device during monitored touch-screen gestures, and also
  (b2) a user-specific characteristic of curvature of monitored touch-screen gestures, and also
  (b3) a user-specific characteristic of landscape/portrait device orientation during monitored touch-screen gestures;
(c) subsequently, monitoring additional touch-screen gestures, and checking whether the additional touch-screen gestures exhibit background tremor and curvature and landscape/portrait device orientation that match the user-specific profile generated in step (b);
(d) if the additional touch-screen gestures do not exhibit background tremor and curvature and landscape/portrait device orientation that match the user-specific profile generated in step (b), then: generating a notification that a user that interacted in step (c) to access said online service, is different from the user that interacted in step (a) to access said online service.

11. The method of claim 10,
wherein the computing device is a device selected from the group consisting of:
a laptop computer, a personal computer, a desktop computer, a mobile computing device, a mobile telephone, a tablet.

12. A method comprising:
(a) monitoring touch-screen gestures of a user, that interacts with an online service via a touch-screen of a computing device;
(b) generating a user-specific profile that is based at least on:
  (b1) a user-specific characteristic of curvature of monitored touch-screen gestures, and also
  (b2) a user-specific characteristic of device acceleration during monitored touch-screen gestures;
(c) subsequently, monitoring additional touch-screen gestures, and checking whether the additional touch-screen gestures exhibit curvature and device acceleration that match the user-specific profile generated in step (b);
(d) if the additional touch-screen gestures do not exhibit curvature and device acceleration that match the user-specific profile generated in step (b), then: generating a notification that a user that interacted in step (c) to access said online service, is different from the user that interacted in step (a) to access said online service.

13. The method of claim 12,
wherein the computing device is a device selected from the group consisting of:
a laptop computer, a personal computer, a desktop computer, a mobile computing device, a mobile telephone, a tablet.

14. A system comprising:
one or more processors, that are configured to execute code,
which are operably associated with one or more memory units that are configured to store code,
wherein the one or more processors are configured to perform a process comprising:
(a) monitoring touch-screen gestures of a user, that interacts with an online service via a touch-screen of a computing device;
(b) generating a user-specific profile that is based at least on:
  (b1) device acceleration during touch-screen gestures of the user, and also
  (b2) device tilt during touch-screen gestures of the user, and also
  (b3) device tremor during touch-screen gestures of the user;
(c) subsequently, monitoring additional touch-screen gestures, and checking whether the additional touch-screen gestures exhibit device acceleration and device tilt and device tremor that match the user-specific profile generated in step (b);
(d) if the additional touch-screen gestures do not exhibit device acceleration and device tilt and device tremor that match the user-specific profile generated in step (b), then: generating a notification that a user that interacted in step (c) to access said online service, is different from the user that interacted in step (a) to access said online service.

15. The system of claim 14,
wherein the one or more processors are configured to authenticate the user identity by collecting and monitoring sensory data in the background on the computing device.

16. A system comprising:
one or more processors, that are configured to execute code,
which are operably associated with one or more memory units that are configured to store code,
wherein the one or more processors are configured to perform a process comprising:
(a) monitoring touch-screen gestures of a user, that interacts with an online service via a touch-screen of a computing device;
(b) generating a user-specific profile that is based at least on:
  (b1) a user-specific characteristic of background tremor of the computing device during monitored touch-screen gestures, and also
  (b2) a user-specific characteristic of curvature of monitored touch-screen gestures, and also
  (b3) a user-specific characteristic of landscape/portrait device orientation during monitored touch-screen gestures;
(c) subsequently, monitoring additional touch-screen gestures, and checking whether the additional touch-screen gestures exhibit background tremor and curvature and landscape/portrait device orientation that match the user-specific profile generated in step (b);
(d) if the additional touch-screen gestures do not exhibit background tremor and curvature and landscape/portrait device orientation that match the user-specific profile generated in step (b), then: generating a notification that a user that interacted in step (c) to access said online service, is different from the user that interacted in step (a) to access said online service.

17. The system of claim 16,
wherein the one or more processors are configured to authenticate the user identity by collecting and monitoring sensory data in the background on the computing device.

18. A system comprising:
one or more processors, that are configured to execute code,
which are operably associated with one or more memory units that are configured to store code,
wherein the one or more processors are configured to perform a process comprising:
(a) monitoring touch-screen gestures of a user, that interacts with an online service via a touch-screen of a computing device;
(b) generating a user-specific profile that is based at least on:
   (b1) a user-specific characteristic of curvature of monitored touch-screen gestures, and also
   (b2) a user-specific characteristic of device acceleration during monitored touch-screen gestures;
(c) subsequently, monitoring additional touch-screen gestures, and checking whether the additional touch-screen gestures exhibit curvature and device acceleration that match the user-specific profile generated in step (b);
(d) if the additional touch-screen gestures do not exhibit curvature and device acceleration that match the user-specific profile generated in step (b), then: generating a notification that a user that interacted in step (c) to access said online service, is different from the user that interacted in step (a) to access said online service.

19. The system of claim 18,
wherein the one or more processors are configured to authenticate the user identity by collecting and monitoring sensory data in the background on the computing device.

* * * * *